US 6,662,907 B1

(12) United States Patent
Brundrett et al.

(10) Patent No.: US 6,662,907 B1
(45) Date of Patent: *Dec. 16, 2003

(54) AIRCRAFT BRAKE AND METHOD WITH ELECTROMECHANICAL ACTUATOR MODULES

(75) Inventors: Robert L. Brundrett, Troy, OH (US); Stephen A. Mascarella, Beavercreek, OH (US); Lawrence F. Corio, Troy, OH (US); Franklin C. Christ, Pompton Plains, NJ (US)

(73) Assignee: The B. F. Goodrich Company, Richfield, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/628,171

(22) Filed: Jul. 31, 2000

Related U.S. Application Data

(63) Continuation of application No. 09/023,911, filed on Feb. 13, 1998, now Pat. No. 6,095,293.

(51) Int. Cl.⁷ ............................................. F16D 55/02
(52) U.S. Cl. ................................... 188/71.6; 188/73.32
(58) Field of Search .............................. 188/72.1, 72.7, 188/72.8, 71.9, 162, 106 P, 18 A, 73.32, 366, 367, 368, 369, 71.6

(56) References Cited

U.S. PATENT DOCUMENTS 3,547,234 A    12/1970   Smith et al.
4,381,049 A *  4/1983   Crossman ................. 188/72.7
4,432,440 A *  2/1984   Crossman ................. 188/71.2
4,542,809 A *  9/1985   Crossman ................. 188/72.8
4,567,967 A *  2/1986   Crossman ................. 188/72.3
4,596,316 A *  6/1986   Crossman ................. 188/72.1
4,865,162 A *  9/1989   Morris et al. ............. 188/72.8
5,186,287 A    2/1993   Lindner et al.
5,330,034 A    7/1994   Rancourt et al.
6,095,293 A *  8/2000   Brundrett et al. .......... 188/72.1

FOREIGN PATENT DOCUMENTS

DE    37 40373 A1    6/1988
FR    2 764 352 A    12/1998
GB    1 302 216      1/1973

* cited by examiner

Primary Examiner—Pam Rodriguez
(74) Attorney, Agent, or Firm—Renner, Otto, Boisselle & Sklar, LLP

(57) ABSTRACT

An electrically actuated aircraft brake and method characterized by the use actuator modules which can be easily and quickly replaced as a unit. Quick and easy replacement of the actuator modules can be effected without disassembly of the overall brake and wheel assembly. Accordingly, brake manufacturing, repair costs, overhaul, parts stocking and maintenance costs and requirements are minimized and/or greatly simplified compared to integrated brake designs used in the prior art. Also, a malfunctioning actuator module on an aircraft can be replaced and preferably quickly enough to allow the aircraft to remain in scheduled service and/or with a minimum of downtime.

16 Claims, 2 Drawing Sheets

AIRCRAFT BRAKE AND METHOD WITH ELECTROMECHANICAL ACTUATOR MODULES

This application is a continuation of application Ser. No. 09/023,911, filed Feb. 13, 1998, now U.S. Pat. No. 6,095,293.

FIELD OF THE INVENTION

The invention herein described relates generally to brakes and methods, more particularly to brakes and methods using electromechanical actuators, and still more particularly to electrically actuated aircraft brakes and methods.

BACKGROUND OF THE INVENTION

Aircraft wheel and brakes heretofore have included a non-rotatable wheel support, a wheel rotatably mounted to the wheel support, and a brake disk stack having alternating rotor and stator disks mounted with respect to the wheel support and wheel for relative axial movement. Each rotor disk is coupled to the wheel for rotation therewith and each stator disk is coupled to the wheel support against rotation. A back plate is located at the rear end of the disk pack and a brake head is located at the front end. The brake head may house a plurality of actuator rams that extend to compress the brake disk stack against the back plate. Torque is taken out by the stator disks through a static torque tube or the like.

Electrically actuated aircraft brakes of various configurations are known, as exemplified by U.S. Pat. Nos. 4,381,049, 4,432,440, 4,542,809 and 4,567,967. The brakes shown in these patents include electric motors which respond to an electrical control signal to effect rotation of a ring gear member which interacts through a plurality of balls to drive a linearly movable ram member into contacting engagement with a brake disk stack to effect compression thereof and braking of a wheel.

In U.S. Pat. No. 4,596,316, another configuration of an electrically actuated brake uses a roller screw drive wherein a ring gear member interacts through a plurality of roller screws to drive a ram member into engagement with a brake pressure plate to effect compression of the brake disk stack for braking action. A plurality of electric motors and their associated pinions drive a ring gear into rotation and the plurality of roller screws effect linear axial movement of the ram member.

In U.S. Pat. No. 4,865,162, a further electrically actuated aircraft brake employs a roller screw drive mechanism driven by an electric torque motor through a gear drive associated with either the screw or the nut of the roller screw drive mechanism. Rotation of the gear drive by the torque motor moves the other one of the screw or nut into axial engagement with a brake disk stack to compress the stack for braking. A plurality of the roller screw drive mechanisms and respective gear drives and torque motors are assembled in a brake head in a balanced arrangement about the axis of the wheel to apply and release a brake pressure force on the brake disk stack in response to an electrical control signal to the torque motors.

The repair or maintenance of these presently known brakes including torque motor driven rams heretofore has required significant disassembly of the brake. The complex integrated nature of prior art designs normally require substantial teardown of the assembly for maintenance, repair and/or overhaul of the assembly even if minor repair or only replacement of a single faulty component is required. Associated with extensive teardown is a lengthy reassembly and retest procedure to verify flight worthiness. Also, a highly integrated design and assembly with complex machining and assembly procedures is costly to process and manufacture. Distribution and parts stocking of individual components of such an assembly is similarly complex and inefficient as cam be appreciated by those knowledgeable in this area. Consequently, an aircraft, for example a commercial passenger aircraft, would most likely have to be taken out of scheduled service until a faulty actuator could be serviced. This results in lost revenue for the airline, scheduling adjustments, considerable inconvenience for customers, etc.

SUMMARY OF THE INVENTION

The present invention provides a brake and method characterized by the use actuator modules each of which can be easily and quickly replaced as a unit. This enables quick and easy replacement of the actuator modules preferably without requiring disassembly of the overall brake and wheel assembly. Also, it is conceivable that a malfunctioning actuator module could be replaced on an aircraft and tested with a minimum of equipment preferably quickly enough to allow the aircraft to remain in scheduled service and/or with a minimum of downtime. In addition, periodic maintenance of the brake can be done quicker and more efficiently by replacing the actuator modules with reconditioned and/or new actuator modules.

Accordingly, a preferred embodiment of a brake according to the present invention comprises a brake disk stack, a brake head, and at least one actuator module mounted to the brake head. The actuator module includes a module housing, a reciprocating ram and a motive device operatively connected to the reciprocating ram for selectively moving the reciprocating ram into and out of forceful engagement with the brake disk stack for applying and releasing braking force. In accordance with the invention, the actuator module is removable as a unit from one side of the brake head.

Further in accordance with a preferred embodiment of the invention, the actuator module is removable from the brake head from the side thereof opposite the brake disk stack and the ram is guided in the module housing for movement toward and away from the brake disk stack. The ram includes a ram nut, and the motive device preferably includes an electric motor drivingly connected to a lead screw (preferably a ball screw although other type of screw drives ant the like are contemplated) in threaded engagement with the ram nut whereupon rotation of the lead screw effects linear movement of the nut toward and away from the brake disk stack. The ram nut preferably is guided in the module housing for movement toward and away from the brake disk stack. To this end, the module housing includes a guideway for guiding the ram nut, and the guideway and ram nut respectively have polygonal cross-sections defined by plural outer side surfaces which rotationally interfere with one another to restrain rotation of the ram nut relative to the housing.

In a preferred application, the brake is used in combination with an aircraft wheel assembly.

According to another aspect of the invention, there is provided a method for servicing the aforesaid brake. The method comprises the steps of identifying a brake module to be replaced, and removing and replacing the identified brake module with another brake module without disassembly of the brake disk stack. Preferably, when the brake is part of a wheel and brake assembly, the removing and replacing step includes removing and replacing the identified brake module without removal of the wheel from the wheel and brake assembly.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION OF THE INVENTION

Because the invention was conceived and developed for use in an aircraft braking system, it will be herein described chiefly in this context. However, the principles of the invention in their broader aspects can be adapted to other types of braking systems, such as in train brake systems.

Figure 1:
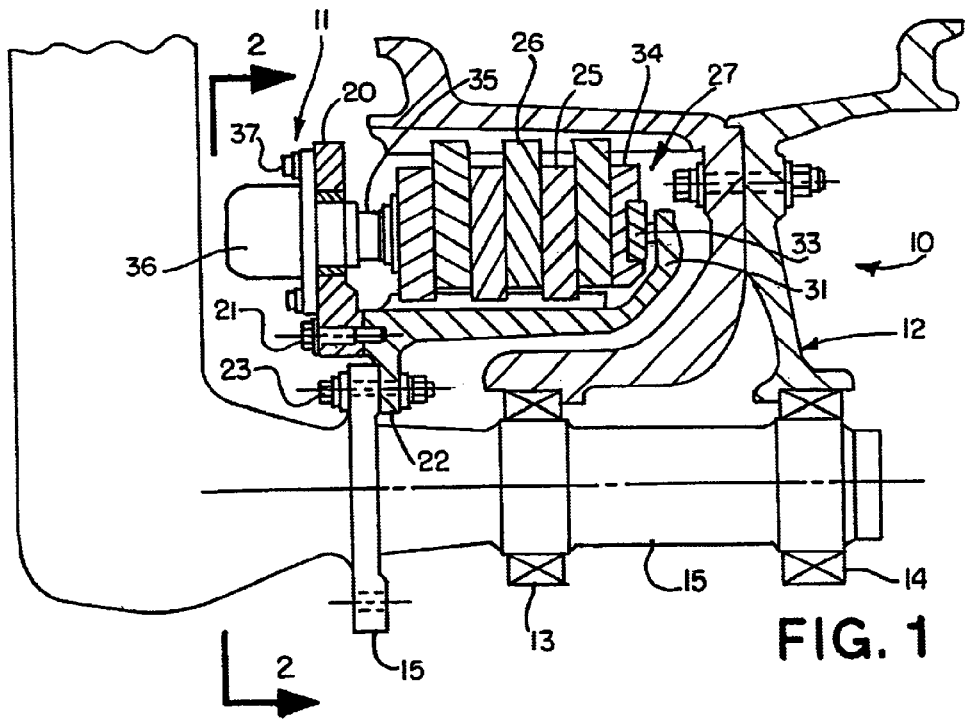
FIG. 1 is a cross-sectional view of an aircraft brake including plural actuator modules mounted to a brake head according to the present invention.

Referring now in detail to the drawings and initially to FIG. 1, a wheel and brake according to the present invention is generally indicated at 10. The assembly 10 generally comprises a brake 11 and an aircraft wheel 12 which is supported for rotation by bearings 13 and 14 on an axle 15. The axle 15 forms a wheel mount and is attached to the end of an aircraft landing gear strut (not shown) or a truck attached to the end of a landing gear strut.

Figure 2:
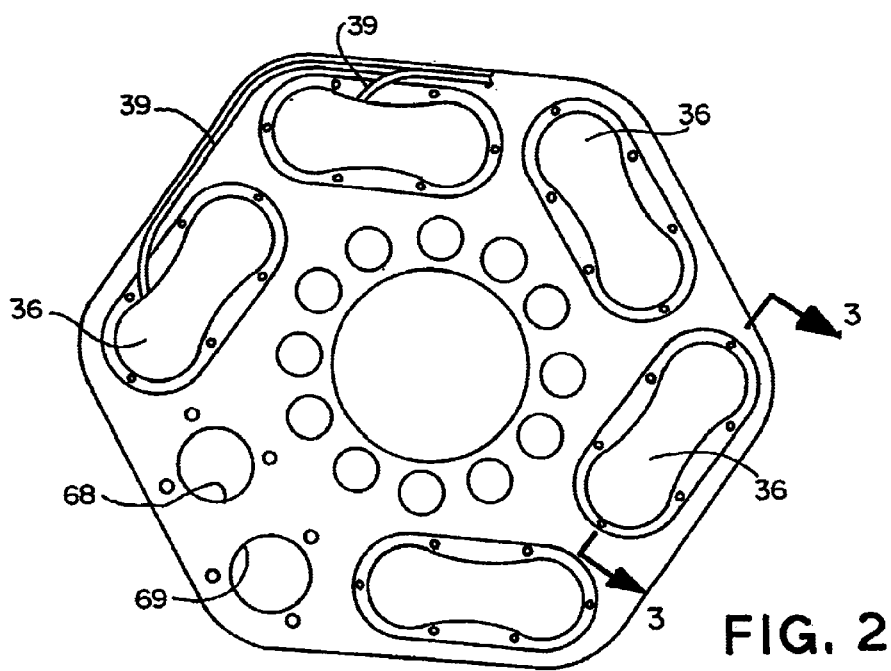
FIG. 2 is an axial end view of the actuator modules and brake head looking from the line 2—2 of FIG. 1, with one of the modules removed.

The brake 11 includes a brake head or housing 20 which is attached by bolt fasteners 21 to a torque tube 22 which in turn is attached by bolt fasteners 23 to a torque take-out flange on the axle 15. Although the invention is being illustrated in the context of a flange mounted type of brake, the principles of the invention may be applied to other types of brakes such as to a torque lug type of brake as will be appreciated by those skilled in the art. The illustrated brake head is a generally planar disk-like plate member having a bolt circle surrounding a central opening as best shown in FIGS. 1 and 2.

The torque tube 22 is surrounded by stationary brake elements and rotary brake elements that are interleaved. The stationary and rotary brake elements are in the form of stator disks 25 and rotor disks 26, and the interleaved arrangement thereof is commonly referred to as a brake disk stack, the same being designated by reference numeral 27. The stator disks 25 are splined to the torque tube and the rotor disks 26 are splined to the wheel 12 interiorly of the wheel's rim. As is conventional, the splined connection may be effected by a plurality of spline or drive keys that are spaced around the circumference of the rim/torque tube to permit axial movement of the rotor/stator disks while being held to the wheel/torque tube against relative rotation.

The disk stack 27 is located between a back pressure member 31 and the brake head 20. The back pressure member 31 is formed by a radial flange at the outer end of the torque tube 22. The radial flange carries thereon a plurality of circumferentially spaced torque pucks 33 engaged with the last brake disk 34 at the rear end of the disk stack 27. The torque pucks 33 may be attached in a known manner to the radial flange 31 by several torque pucks which have the stems thereof loosely fitted in holes in the radial flange to permit some swiveling movement thereof. The torque pucks in the illustrated embodiment secure the last brake disk 34 against rotation relative to the torque tube. In a modified arrangement, the radial flange could be configured to engage directly the disk pack, and still other arrangements could be used.

Pressure is applied to the front end of the disk stack 27 by one or more disk engaging members which in the illustrated embodiment are the inboard ends of one or more actuator rams 35. The actuator rams 35 are included in respective actuator modules 36 mounted to the brake head 20 by removable bolt fasteners 37 or other suitable means enabling quick and easy attachment and detachment of the actuator modules to and from the brake head. As shown in FIG. 2, a plurality of the actuator modules 36 are mounted in a circular arrangement around the rotational axis of the wheel, preferably with the actuator rams circumferentially equally spaced apart. The actuator modules each have extending therefrom a cable 39 (only two shown) for effecting electrical connection to a brake controller (not shown). The controller may include a corresponding number of independent servo amplifiers, a microprocessor with associated peripherals, and data input/output (I/O) circuitry. Details of the controller are not being described herein as the invention does not reside in the type of controller or other circuitry used to control operation of the actuator modules.

Figure 3:
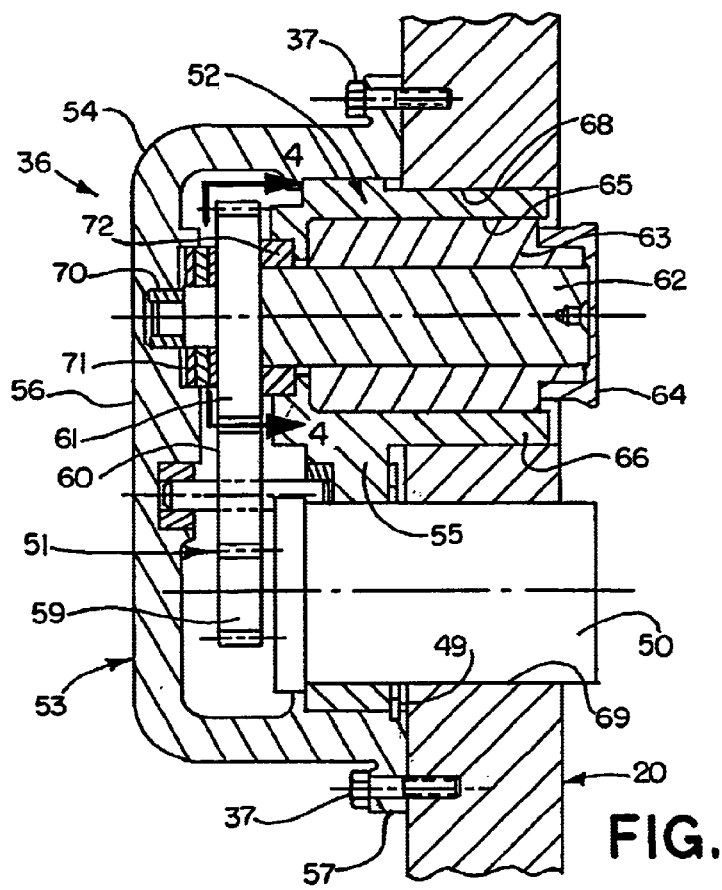
FIG. 3 is cross-sectional view taken along the line 3—3 of FIG. 2, showing one actuator module mounted to the brake head.

Preferably, the modules are identical and interchangeable, and a representative one of the actuator modules is shown somewhat schematically in FIG. 3. Each actuator module 36 preferably includes an electric motor 50, a gear train 51, and a ball screw assembly 52. The motor 50, gearing 51 and ball screw assembly are all carried in a module housing 53. The housing 53 may be composed of one or more housing members. In the illustrated embodiment, the housing is primarily composed of an outer housing member or casing 54 and an inner housing member 55. The outer housing member 54 has a dome shape central portion 56 surrounded by a mounting flange 57. The mounting flange 57 includes plural holes for the removable bolt fasteners 37 used to removably secure the housing, and thus the actuator module, to the outboard side 58 of the brake head 20. The inner housing member 55 is secured to the outer housing member 54 and substantially closes the interior space of the housing and/or maintains the various components of the module assembled together as a unit. Such securement may be effected by any suitable means, such as by the illustrated snap ring 49, for example.

The electric motor 50 may be a DC brushless servo motor. The brushless DC servo motor 50 may contain, in addition to its motor components, an integral friction type, electrically actuated brake, and a resolver for motor rotor commutation and angular velocity sensing. The resolver may be used to provide motor position feedback and velocity information. The brake may be a power-on type or a power-off type, as desired for a particular application. The specific motor selection will be dependent on the requirements for a given braking application.

The gearing 51 includes a pinion 59 on the drive shaft of the electric motor 50, a transfer gear 60 and a screw gear 61 formed integrally with the ball screw 62 of the ball screw assembly 52 (although reference herein is made to certain structures as being integral as is preferred, it should be understood such structures alternatively may be composed of discrete components joined together to form a functionally equivalent structure). The transfer gear is journalled by bearings between the outer and inner housing members and is in mesh with the pinion and the screw gear 61. The transfer gear may be realized by a plurality of gears that mesh to transmit torque and provide the desired gear ratio from the pinion 59 to the screw gear 61.

The ball screw assembly 52 is comprised of the ball screw 62 with the integral gear 61, a hexagonal ball nut 63 that translates rotary motion to linear motion of the ball nut, and a ram pad 64 that attaches to the end of the ball nut and provides an insulating interface with the brake disk stack 27 (FIG. 1). The ball screw and ball nut may be of a known configuration and thus the respective spiral grooves thereof and associated balls have not been illustrated as the same would be immediately evident to one skilled in the art. Also, other rotary to linear motion conversion devices may by employed, if desired, with the linear moving member coinciding with the ball nut and functioning as the actuator ram. The ball nut (also herein referred to as a ram or ram nut) is free to translate along the axis of the ball screw upon rotation of the ball screw, but not to rotate, as the ball nut is guided by a bore 65 in a nut slider 66. In the illustrated embodiment, the nut slider 66 is formed integrally with the inner housing member 55.

Figure 4:
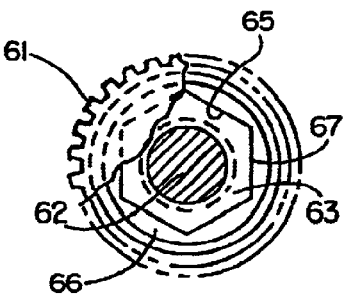
FIG. 4 is a cross-sectional view taken along the line 4—4 of FIG. 3.

As best seen in FIG. 4, the bore or guideway 65 and the ball nut 63 respectively have, in the illustrated preferred embodiment, corresponding polygonal cross-sections defined by plural inner/outer side surfaces (commonly indicated by reference numeral 67) which rotationally interfere with one another to restrain rotation of the ram nut relative to the inner housing 55. As is preferred and illustrated, one or more of the side surfaces, most preferably all of the side surfaces, are planar and form regular polyhedrons providing a close sliding fit between the ball nut and guideway. It will be appreciated, however, that other configurations may be used although less preferred. For example, the number of sides may be varied from the illustrated six-sided polygons (hexagons), as may be desired for a particular application. The six-sided polyhedral configuration provides desired sliding and anti-rotational characteristics.

Preferably, a lubricant, particularly a suitable grease, is used to lubricate that relatively sliding surfaces 67 of the ball nut 63 and guideway 65. It has been found that the grease and close clearance between the ball nut and guideway prevent entry of any appreciable amount of dirt or other foreign material at the sliding surfaces interface so as to prevent any significant degradation of performance. However, if desired, a suitable seal, such as a wiper seal, bellows seal, rolling diaphragm seal, etc. could be employed to seal against passage of dirt or other undesirable materials between the sliding surfaces. An exemplary grease for the ball screw and ram nut assembly is MIL-G-81322 and an exemplary grease for the gear train is MIL-G-81827.

When the actuator module 36 is assembled to the brake head as shown in FIG. 3, the nut slider 66 will extend through an opening 68 in the brake head 20, with the ram pad 64 disposed on the inboard side of the brake head. Similarly, the motor 50 will pass through an opening 69 (or a single opening in the brake head including the areas of the openings 68 and 69), as needed to accommodate the length of the motor. It is noted that both the motor 50 and the ram slider 66 and ram 35 will pass freely through the respective opening 69 and 68 from the outboard side of the brake head, i.e., the portions of these components that extend beyond the outboard surface 58 of the brake head have a cross-section smaller than that of the openings through in the brake head through which they pass. Accordingly, the actuator module 36 can be assembled to the brake head from the outboard side thereof and no access to the inboard side of the brake head is required to enable assembly or disassembly of the actuator module from the brake head.

An alternate arrangement embodies a larger diameter ram pad 64 (sized for a particular braking requirement) which exceeds the diameter of opening 68. In this embodiment, the ram pad can removably attached to the end of the ram for easy removal, such as with a quick disconnect device and more particularly a spring loaded locking device as is conventional in the art. The known spring loaded device enables removal of the ram pad without the need to remove the brake head 20 form the brake, to effect diassembly and reassembly of the module 36 with the brake head 20.

It also is noted that for some applications the motor may be dimensioned or positioned other than as shown, such that the motor may not pass completely through the brake head or even partially into the brake head. In one arrangement for example, the motor may extend only into a hole in the brake head that only opens to the outboard side of the brake head and thus is closed at its other end. Also, it the brake envelope permits, the motor could be located completely outwardly of the brake head and may be otherwise oriented, such as with its axis extending perpendicular to the movement axis of the actuator ram.

As shown in FIG. 3, the ball screw 62 is supported in the module housing by three bearings, a radial bearing 70 and a thrust roller bearing 71 at the outboard end of the ball screw and a radial ball bearing 72 at a location intermediate the nut-engaging threaded portion of the ball screw and the integral gear 61. The radial bearing 72 is supported in the inner housing member 55. The outer housing member 54 locates the radial and thrust bearings and provides mechanical thrust support for the ball screw. As further shown in FIG. 3, the transfer gear 60 is journalled between the inner and outer housing members.

Although not shown, the ram nut may have associated therewith an output ram position sensor which provides for actuator position feedback. For example, the ball nut 63 (actuator ram 35) may be mechanically connected to an LVDT position sensor by a bracket. The LVDT armature may be adjustably attached to the bracket (or the sensor body to the module housing) by suitable means that provides for LVDT setting and position calibration. Other types of position sensors/transducers may be used as desired for a particular application.

Although it will be immediately evident to those skilled in the art, the purpose of the brake actuator(s) is to impress a clamping force on a stack of brake disk elements. The electromechanical (EM) actuators operate simultaneously to produce a clamping force between a brake reaction or back pressure member 31 and the actuator output rams 35. The size and number of actuators may be varied to provide the total brake clamping force required. The actuators may be operated in a controlled displacement mode such that the clamping force is proportional to the position of the rams. That is, the position of the rams, as opposed to motor current, preferably is used to obtain desired braking load. It is noted, however, that brake force control may be carried out in a current mode.

Figure 5:
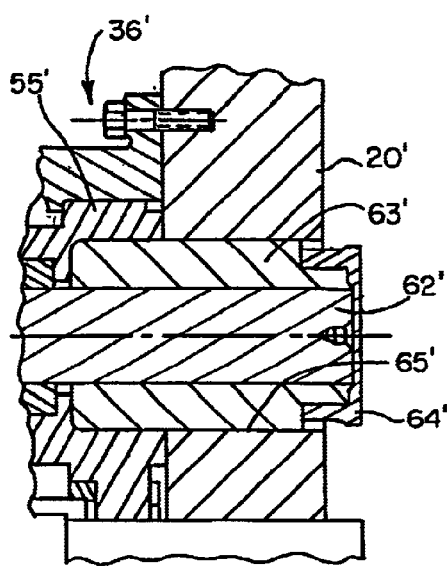
FIG. 5 is a fragmentary cross-sectional view of a modified aircraft brake according to the invention.

In the brake shown in FIG. 3, the ram slider 66 is an integral part of the module housing, i.e. it is carried by module housing for removal from the brake head 20 as a unit along with the other components of the actuator module 36. In an alternative embodiment illustrated in FIG. 5 (wherein like parts are identified by the same but primed reference numerals), the ram slider may instead be formed as an integral part of the brake head 20' (that is, the guideway 65' is formed in the brake head, for example, directly or by a liner fixed in the brake head). Thus, in this embodiment the ram slider is not removable as part of the actuator module 36'. Notwithstanding, the actuator module 36' will still be removable as a unit from .the outboard side of the brake head 20'. The insulator pad 64' on the end of the ram may have a cross-sectional size and shape that will allow it to pass through the hole (guideway) in the brake head, or as previously described the ram pad may be attached to the ram nut by a quick connect/disconnect device, such as a spring detent device, to enable quick removal of the ram pad from the ram nut and thus enable removal of the actuator module without having to remove the brake head from the brake.

In view of the foregoing, it will now be appreciated that there is provided a brake assembly that enables easy and quick replacement of a malfunctioning electromechanical actuator. No longer must a brake be substantially dissembled to repair a malfunctioning actuator or other actuator identified for repair and/or replacement. Instead, a malfunctioning actuator module 36 (or all of the actuator modules if the malfunctioning module can not be determined) can be removed from the brake head 20 simply by removing the fasteners 37 and withdrawing the module from the outboard side of the brake head. This can be accomplished without having to disassemble the brake disk stack and even with the wheel in place on the axle, as access usually can be gained in most wheel and brake assemblies to the outboard side of the brake head. To facilitate the easy removal and replacement of the actuator modules, the electrical cable 39 (FIG. 2) associated with each module preferably is equipped with a quick connect/disconnect coupling.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

In addition, the invention is considered to reside in all workable combinations of features herein disclosed, whether initially claimed in combination or not and whether or not disclosed in the same embodiment.

What is claimed is:

1. An electromechanical brake comprising a brake disk stack including rotor and stator disks, a brake head, and at least one actuator module mounted to the brake head, the actuator module including a module housing, a reciprocating ram and an electric motor operatively connected to the reciprocating ram for selectively moving the reciprocating ram into and out of forceful engagement with the brake disk stack for applying and releasing braking force, and wherein the actuator module is removable as a unit from one side of the brake head.

2. A brake as set forth in claim 1, wherein the actuator module is removable from the brake head from the side thereof opposite the brake disk stack.

3. A brake as set forth in claim 1, wherein the ram is guided in the module housing for movement toward and away from the brake disk stack.

4. A brake as set forth in claim 1, wherein the ram is guided in the brake head for movement toward and away from the brake disk stack.

5. A brake as set forth in claim 1, wherein linear movement of the ram is effected by relative rotation of a nut and lead screw.

6. A brake as set forth in claim 1, in combination with an aircraft wheel assembly.

7. A brake as set forth in claim 1, wherein a plurality of the actuator modules are circumferentially equally spaced around a center axis of the brake head.

8. A method for servicing a brake including a brake disk stack including rotor and stator disks, and a brake head to which a plurality of electromechanical actuator modules are removably mounted, each actuator module including an electric motor operatively connected to a reciprocating ram for selectively moving the reciprocating ram into and out of forceful engagement with the brake disk stack for applying and releasing braking force, the method comprising the steps of identifying a brake module to be replaced, and removing and replacing the identified brake module with another brake module without disassembly of the brake disk stack.

9. A method as set forth in claim 8, wherein the brake is part of a wheel and brake assembly, and the removing and replacing step includes removing and replacing the identified brake module without removal of the wheel from the wheel and brake assembly.

10. A wheel and brake assembly comprising:
   a rotatable wheel;
   a brake disk stack including rotor and stator disks, the brake disk stack being operatively connected to the wheel for applying and releasing braking torque on the rotatable wheel;
   a brake head;
   a plurality of electromechanical actuator modules each including a reciprocating ram, an electric motor operatively connected to the reciprocating ram for selectively moving the reciprocating ram into and out of forceful engagement with the brake disk stack for applying and releasing braking torque on the rotatable wheel, and a module housing in which the ram and motive device are carried for removal as a unit from one side of the brake head.

11. A wheel and brake assembly as set forth in claim 10, wherein the actuator module is removable from the brake head without removal of the rotatable wheel.

12. A wheel and brake assembly as set forth in claims 10, wherein the module housing includes a guideway and the ram is guided by the guideway for linear movement.

13. A wheel and brake assembly as set forth in claim 10, wherein the plurality of actuator modules are circumferentially equally spaced around a center axis of the brake head.

14. A wheel and brake assembly as set forth in claim 13, wherein the brake head includes a guideway and the ram is guided by the guideway for linear movement.

15. An electro-mechanical actuator module for use in a wheel and brake assembly including a rotatable wheel; a brake disk stack including rotor and stator disks, the brake disk stack being operatively connected to the wheel for applying and releasing braking force on the rotatable wheel; and a brake head; said actuator module comprising a reciprocating ram, an electric motor operatively connected to the reciprocating ram for selectively moving the reciprocating ram into and out of forceful engagement with the brake disk stack for applying and releasing braking force on the rotatable wheel, and a module housing in which the ram and motive device are carried and which is configured for removable attachment to the brake head, whereby the actuator module is removably attachable as a unit to the brake head.

16. A wheel and brake assembly as set forth in claim 15, wherein the module housing includes a guideway and the ram is guided by the guideway for linear movement.

\* \* \* \* \*